(12) United States Patent
Kesting et al.

(10) Patent No.: US 11,162,801 B2
(45) Date of Patent: Nov. 2, 2021

(54) METHODS AND SYSTEMS FOR DETECTING AN OPEN NAVIGABLE ELEMENT

(71) Applicant: TomTom Traffic B.V., Amsterdam (NL)

(72) Inventors: Arne Kesting, Amsterdam (NL); Nikolaus Witte, Amsterdam (NL); Robin Tenhagen, Amsterdam (NL)

(73) Assignee: TOMTOM TRAFFIC B.V., Amsterdam (NL)

(*) Notice: Subject to any disclaimer, the term of this patent is extended or adjusted under 35 U.S.C. 154(b) by 0 days.

(21) Appl. No.: 15/755,682

(22) PCT Filed: Sep. 1, 2016

(86) PCT No.: PCT/EP2016/070583
§ 371 (c)(1),
(2) Date: Feb. 27, 2018

(87) PCT Pub. No.: WO2017/037155
PCT Pub. Date: Mar. 9, 2017

(65) Prior Publication Data
US 2018/0252541 A1 Sep. 6, 2018

(30) Foreign Application Priority Data
Sep. 1, 2015 (GB) .................................. 1515487.5

(51) Int. Cl.
*G01C 21/34* (2006.01)
*G01C 21/36* (2006.01)
(Continued)

(52) U.S. Cl.
CPC ..... *G01C 21/3415* (2013.01); *G01C 21/3461* (2013.01); *G01C 21/3492* (2013.01);
(Continued)

(58) Field of Classification Search
CPC ................. G01C 21/3415; G01C 21/32; G01C 21/3694; G01C 21/3691; G01C 21/3492;
(Continued)

(56) References Cited

U.S. PATENT DOCUMENTS 7,203,595 B1 * 4/2007 Auxer .................... G01C 21/26
340/995.13
8,606,511 B2 12/2013 Johnson
(Continued)

FOREIGN PATENT DOCUMENTS

EP 2650649 10/2013
GB 2428852 2/2007
(Continued)

OTHER PUBLICATIONS

Weijermars, W., "Analysis of urban traffic patterns using clustering," Apr. 13, 2007, Retrieved from the Internet at: https://ris.utwente.nl/ws/portalfiles/portal/6069766, last viewed Jun. 29, 2018.
(Continued)

*Primary Examiner* — Matthew Franklin Gordon
(74) *Attorney, Agent, or Firm* — Park, Vaughan, Fleming & Dowler LLP (57) ABSTRACT

A method and system of detecting when a navigable element previously determined to be closed is in an open state is disclosed, the navigable element forming part of a network of navigable elements within a geographic area, the navigable elements being represented by segments of an electronic map. Positional data relating to the movement of a plurality of devices along the navigable elements of the navigable network with respect to time is obtained, and a navigable element is identified as being in a closed state based at least on the positional data and a first visit interval associated with the segment representing the navigable element. The positional data is then used to determine a (Continued)

second visit interval for the segment representing the navigable element, and the navigable element is changed to be in an open state when a parameter based on the determined second visit interval for the segment representing the navigable element passes a predetermined threshold value.

19 Claims, 5 Drawing Sheets

(51) Int. Cl.
*H04W 4/02* (2018.01)
*G08G 1/01* (2006.01)
*G08G 1/065* (2006.01)
*G01C 21/32* (2006.01)

(52) U.S. Cl.
CPC ..... *G01C 21/3691* (2013.01); *G01C 21/3694* (2013.01); *G08G 1/0112* (2013.01); *G08G 1/0133* (2013.01); *G08G 1/0141* (2013.01); *G08G 1/065* (2013.01); *H04W 4/025* (2013.01); *G01C 21/32* (2013.01)

(58) Field of Classification Search
CPC ... G01C 21/3461; H04W 4/025; G08G 1/065; G08G 1/0141; G08G 1/0133; G08G 1/0112
See application file for complete search history.

(56) References Cited

U.S. PATENT DOCUMENTS

| | | | |
|---|---|---|---|
| 2009/0138497 A1* | 5/2009 | Zavoli | G09B 29/106 |
| 2010/0256903 A1* | 10/2010 | Johnson | G01C 21/32 |
| | | | 701/533 |
| 2011/0231087 A1 | 9/2011 | Johnson et al. | |
| 2011/0276263 A1* | 11/2011 | Shimotani | G01C 21/32 |
| | | | 701/532 |
| 2012/0143492 A1 | 5/2012 | Johnson | |
| 2016/0078758 A1* | 3/2016 | Basalamah | G08G 1/0112 |
| | | | 701/118 |
| 2016/0275787 A1* | 9/2016 | Kesting | G01C 21/32 |

FOREIGN PATENT DOCUMENTS

| | | |
|---|---|---|
| WO | 2009157651 | 12/2009 |
| WO | 2010105712 | 9/2010 |
| WO | 2015104383 | 7/2015 |

OTHER PUBLICATIONS

International Search Report, application No. PCT/EP2016/070583, dated Dec. 5, 2016.

United Kingdom Search Report, application No. GB1515487.5, dated Dec. 24, 2015.

* cited by examiner

———— instantaneous
— — — mean

METHODS AND SYSTEMS FOR DETECTING AN OPEN NAVIGABLE ELEMENT

CROSS-REFERENCE TO RELATED APPLICATIONS

The present application is a National Stage of International Application No. PCT/EP2016/070583, filed on Sep. 1, 2016, and designating the United States, which claims benefit to United Kingdom Patent Application 1515487.5 filed on Sep. 1, 2015. The entire content of these applications is incorporated herein by reference.

FIELD OF THE INVENTION

The present invention relates to methods and systems for detecting when a navigable element, e.g. a road element, of a navigable network of navigable elements, e.g. a road network, that has previously been determined to be closed is in an open state.

BACKGROUND TO THE INVENTION

Obtaining information about closures of navigable elements, e.g. roads of a road network, is important in a navigation system. The presence of a road closure has a significant impact upon routing through the road network. A road closure may be likened to a traffic jam associated with an "infinite delay", such that an alternative routing must be determined to avoid the affected road element(s). Knowledge of the existence of a road closure is of importance to road users even if they are not following a pre-calculated route. For example, if a user is following a familiar route, it is still useful for them to be aware if a road closure is present affecting the route so that they may determine an alternative route, with or without the assistance of a navigation system.

Road closure information may be provided to a user, e.g. together with other travel and traffic information, during navigation along a route via an in-vehicle navigation device, such as a portable device (PND) or integrated device, or may be provided as an input to an Advanced Driver Assistance System (ADAS) device. Road closure information may also be used for route planning, e.g. by a navigation or ADAS device, before commencing a journey, or to recalculate a fastest route during a journey if conditions change during traversal along the route.

A road closure is typically a dynamic event, temporarily affecting a road, and it is therefore desirable to be able to obtain information relating to road closures in the context of a "live" system, i.e. indicative of the relatively current condition of the road network.

Conventional systems for obtaining information about road closures typically rely upon data obtained from third parties. For example, such data may be included in "Traffic Message Channel" (TMC) messages that may be broadcast over an FM network, or other similar third party messages. Such information may be based upon data obtained from sources such as police reports, or road agencies/administrators. However, there are some drawbacks in relying upon third party data relating to road closures, since such data is not always accurate, and may not be up to date.

WO 2015/104383 A1, for example, therefore describes a system in which the closure of a road in a road network can be determined using obtained positional data relating to the movement of a plurality of devices, e.g. vehicles, along the road network with respect to time. In particular, the positional data is used to determine an elapsed time since a device was last detected on a road, and the determined elapsed time is then compared to an expected time interval between consecutive devices being detected on the road. When the determined elapsed time exceed the expected time by a predetermined amount, then the road can be considered by the system to be closed, possibly following one or more validation steps. The expected time interval can be an average time interval; for example based upon a plurality of (detected) time intervals between consecutive pairs of devices passing along the element according to historical positional data, i.e. positional data obtained in the recent past for a similar time of day and day of week.

In such systems, however, it is possible that a road can be considered closed when in reality the reduction in vehicular flow along the road as determined from obtained positional data has been caused for another reason. The Applicant has realised that there remains scope for improvement in methods and systems for identifying when a navigable element previously determined to be closed is in an open state, such as may occur after an erroneous closure determination, i.e. a "false positive" closure, to ensure that such elements can be determined to be in an open state once more without delay, and thereby enable reliable closure information to be provide, e.g. to users and/or navigation or ADAS devices.

SUMMARY OF THE INVENTION

In accordance with a first aspect of the invention there is provided a method of detecting when a navigable element previously determined to be closed is in an open state, the navigable element forming part of a network of navigable elements within a geographic area, the navigable elements being represented by segments of an electronic map, the method comprising:

obtaining positional data relating to the movement of a plurality of devices along the navigable elements of the navigable network with respect to time;

identifying a navigable element as being in a closed state based at least on the positional data and a first visit interval associated with the segment representing the navigable element, wherein said first visit interval is indicative of an expected time interval between consecutive devices being detected on the element when in an open state;

using the positional data to determine a second visit interval for the segment representing the navigable element, wherein said second visit interval is indicative of an average time interval between consecutive devices being detected on the element when in the closed state; and changing the navigable element to be in an open state when a parameter based on the determined second visit interval for the segment representing the navigable element passes a predetermined threshold value.

The Applicant has recognised that when an element of a navigable network is determined to be closed, i.e. in a closed state, based at least in part upon positional data relating to the movement of devices along the element ("probe data"), e.g. an absence or insufficient amount thereof, together with data indicative of an expected time interval between consecutive devices being detected on the element when in an open state, this conclusion can occasionally be erroneous. In other words, the use of probe data may result in a "false positive" determination of the closure of an element which is, in fact, still open. The traffic flow rate along an element indicated by probe data may decrease below an expected level for reasons other than the element being closed. For example, the flow rate may decrease as a result of a newly constructed or temporary navigable element, e.g. road element, providing an alternative route opening nearby. The present invention provides a way of detecting when an element has incorrectly been determined to be closed based upon probe data. This is achieved by using probe data relating to the movement of devices with respect to time along an element when it is in the closed state to obtain an average visit interval for the segment representing the element when in the closed state. The average visit interval corresponds to the average time interval between consecutive devices being detected on the segment in the closed state. If this average visit interval in the closed, or a parameter based thereon, passes a predetermined threshold, indicating a certain level of flow along the element, then it can be assumed that the element was incorrectly determined to be closed, and it is reopened.

The method may comprise, for each segment representing a navigable element determined to be closed, generating data indicative of the closed state of the element, and associating the data with the segment representing the element, and, for each element determined to be open, generating data indicative of the open state of the element, and associating the data with the segment representing the element.

The present invention extends to a system for carrying out a method in accordance with any of the embodiments of the invention described herein.

In accordance with a second aspect of the invention there is provided a system for detecting when a navigable element previously determined to be closed is in an open state, the navigable element forming part of a network of navigable elements within a geographic area, the navigable elements being represented by segments of an electronic map, the system comprising:

means for obtaining positional data relating to the movement of a plurality of devices along the navigable elements of the navigable network with respect to time;

means for identifying a navigable element as being in a closed state based at least on the positional data and a first visit interval associated with the segment representing the navigable element, wherein said first visit interval is indicative of an expected time interval between consecutive devices being detected on the element when in an open state;

means for using the positional data to determine a second visit interval for the segment representing the navigable element, wherein said second visit interval is indicative of an average time interval between consecutive devices being detected on the element when in the closed state; and means for changing the navigable element to be in an open state when a parameter based on the determined second visit interval for the segment representing the navigable element passes a predetermined threshold value.

The present invention in these further aspects may include any or all of the features described in relation to the first and second aspects of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, positional data, data indicative of first and second visit intervals, whether in the closed or open state, determined closed or open states of segments (and thus elements), and, as discussed below, data indicative of passability parameters for segments and reports used to determine the existence of a potential closure or reopening.

The methods of the present invention are, in preferred embodiments, implemented by a server. In other words, the methods of the presented invention are preferably computer implemented methods. Thus, in embodiments, the system of the present invention comprises a server comprising the means for carrying out the various steps described, and the method steps described herein are carried out by a server.

The step of using the positional data to determine when an element may be considered to be in a closed state may be carried out in any suitable manner. The positional data may be used to assess the flow along the element, and hence to determine when the flow falls below an expected level for the element indicative of a closure of the element. The expected level for the element is the first visit interval, or a parameter based thereon, such as the passablity parameter as discussed in more detail below.

The first visit interval is indicative of an expected time interval between consecutive devices being detected on the element when in an open state, and can be, or be based on, an average visit interval for the element when in an open state. The average visit interval refers to the average time interval between consecutive devices being detected on the segment when in the open state. The first visit interval for an element, and which is preferably associated with the segment that represents the element, is preferably determined by analysing positional data relating to the movement of devices along the navigable element with respect to time. However, it may alternatively be derived using other techniques e.g. theoretical techniques, or combinations thereof. Thus, the interval is a statistical expectation of the period of time between which consecutive probe devices are expected to be detected traversing the navigable element; and may or may not be based upon intervals between actually detected devices. In preferred embodiments the first visit interval is based upon historical positional data relating to the movement of devices, e.g. associated with vehicles, along the element with respect to time when in an open state. The first visit interval may be based upon an average, e.g. a mean, of a plurality of (detected) time intervals between consecutive pairs of devices passing along the element according to historical positional data. Where the first visit interval is based upon historical positional data it may be an average determined based upon historical positional data relating to any given time period, e.g. the last week or month, etc.

In some embodiments the method may comprise determining the first visit interval for an element, e.g. using one the methods discussed above, and associating the determined first visit interval with the segment representative of the navigable element in the electronic map. The relevant stored first visit interval can then be accessed when needed to identify whether the navigable element is in a closed state.

It will be appreciated that the expected flow along an element will typically vary with respect to time. For example, the flow along an element e.g. as indicated by an average time interval between devices being detected on the element, will typically vary over the course of the day, with the average time interval being smaller at busier times. In preferred embodiments, the first visit interval is therefore time dependent. The method may comprise, at different times, updating the first visit interval associated with each segment based upon a current time. This may be carried out continually, e.g. for each instant in time, or at intervals, e.g. after the expiry of a predetermined period for which a particular first, e.g. average, time interval may be considered applicable. The first, e.g. average, visit interval may be in respect of an instantaneous time, or a predetermined time period, such as 15 minutes, 30 minutes, or any desired period. A predetermined time period may be chosen by reference to correspond to a time period typically used when refreshing or analysing positional data.

In some embodiments the first expected visit interval between consecutive devices in the open state may be determined based upon current positional data for each new time, e.g. relating to a single time or an applicable time period. However, this may be computationally complex. In some preferred embodiments, therefore, the same average expected visit interval in the open state is used for multiple different times, e.g. instantaneous times or time periods. The average visit interval may then be made applicable to the current time by scaling the average visit interval based upon current conditions in the navigable network to provide an average visit interval applicable to the current time. For example, in an embodiment, the number of concurrent probe devices from which "live" data is currently being received can be used to scale the average visit interval. As will be understood, the number of concurrent probe devices will typically be higher during peak hours, and thus the average visit interval is preferably reduced during these hours and increased during off-peak hours, e.g. during the night, weekends and/or bank holidays. Accordingly, there is preferably an inverse relationship between the value of the average visit interval to be used in the method at a given time and the number of concurrent probe devices from which positional data is being received. In some preferred embodiments the time dependent average visit interval is obtained by scaling an average expected visit interval based upon a ratio between a current number of concurrent probe devices and the average number of concurrent probe devices expected in the system. The average number of concurrent probe devices may be an average over a month, week or any suitable time frame. The ratio will then provide an indication as to whether it is a relatively busy or relatively quiet time. These techniques may be more procedurally efficient, allowing an average visit interval to be determined and used over a longer period, e.g. a month or week, with scaling based upon the current number of concurrent probe devices to provide it with time dependence.

In some embodiments, the navigable element can be identified as being closed when a current visit interval for an element determined using positional data passes, e.g. exceeds, a predetermined threshold based upon the first visit interval for the element. The predetermined threshold may be time dependent, since, for example, the expected visit interval for a segment would likely be lower during busy periods, e.g. rush hour, than at night.

However, in preferred embodiments at least some of the segments of the electronic map are each associated with data indicative of a variable passability parameter for the segment, the passability parameter being indicative of the likelihood of the navigable element represented by the segment being closed. The passability parameter associated with a segment varies according to a predefined function with respect to time such that the likelihood of the navigable element represented by the segment being closed increases with respect to time. The passablity parameter for a segment is based upon the first visit interval associated with the segment. For example, in a preferred embodiment, the predefined function is based on the first visit interval, such that the parameter varies at a rate based at least in part on the first visit interval. The method preferably comprises modifying, for each of one or more segments, the value of the passability parameter associated with the segment such that the likelihood of the navigable element represented by the segment being closed is decreased, when the positional data relating to the movement of a plurality of devices along the navigable elements of the navigable network with respect to time indicates that a device has been detected traversing the navigable element, and identifying a navigable element as being potentially closed when the value of the passability parameter associated with the segment representing the navigable element passes a predetermined closure threshold. The modification of the passability parameter which occurs when probe data indicates the detection of a device on the element will provide an interruption to the otherwise increasing likelihood of closure indicated by the passability parameter as a result of its variation, e.g. decay, with respect to time. The value of the passability parameter preferably decreases with respect to time so that the likelihood of the element being closed (as indicated by the parameter) increases with respect to time, and in such embodiments the predefined function is a decay function, i.e. causing the value of the passability parameter to decrease (or age) over time. The predefined function, e.g. decay function that is used to age the passability parameter associated with a segment may be of any suitable form. For example, the decay function may be at least one of: a linear function, an exponential function, and a polynomial (e.g. quadratic, cubic, etc) function.

In preferred embodiments in which the value of the passability parameter decreases with respect to time, the rate of decrease of the passability parameter is preferably dependent upon an inverse of the first visit interval (and the predefined function is preferably dependent upon an inverse of the first visit interval). In this way, where a greater interval between devices is expected, the rate of decrease of the parameter will be less great than where a lesser interval between devices is expected. This may avoid a threshold indicative of closure being reached prematurely for less busy elements, for which fewer devices are expected to be detected to prompt an increase in the parameter. Of course, where the passability parameter increases with respect to time, the rate of decrease may conversely be dependent upon the first visit interval.

The value of the passability parameter is preferably bounded, e.g. between 0 and 1. This provides ease of comparison between the values of parameters for different segments, and at different times. The passability parameter therefore provides an indication of the relative likelihood of closure of the segment. For example, the passability parameter for a segment can be bounded by the first visit interval for the segment. The reason for this is that it is typically not of interest in the context of detecting closed segments to know that the average flow along a segment is greater than expected, only that the average flow is less than expected. Thus, in embodiments, the passability parameter can vary between an upper limit, e.g. 1, which is representative of flow along the navigable element represented by the segment at an expected or greater than average level, and a lower limit, e.g. 0, which is representative of zero flow. It should be appreciated, however, that due to probe data from construction vehicles or wrongly map matched probe data, it is unlikely that any segment will actually ever have a passability equal to the lower limit, e.g. 0.

Thus, in accordance with these preferred embodiments of the invention, segments of an electronic map representing real world navigable elements of a navigable network are associated with data indicative of a respective passability parameter. At least some of the segments of the electronic map are associated with data indicative of a passability parameter for the segment. A plurality of the segments, and preferably each segment of the electronic map is associated with such data. The passability parameter has a value which is indicative of the likelihood of the closure of the navigable element represented by the segment. The passability parameter is a dynamically varying parameter. The passability parameter is indicative of the likelihood of the navigable element represented by the segment being closed. As a segment is directional, the passability parameter refers to the likelihood of the navigable element represented by the segment being closed in a given direction. Where a segment is bi-directional, passability parameters may be associated with the segment in respect of each of the different directions of travel along the navigable element represented by the segment. The (or each) passability parameter associated with a segment is a dynamically varying parameter. Where multiple passability parameters are associated with a segment for different directions of travel, each may be modified and used in accordance with any of the embodiments described below.

The passability parameter may be such that higher values of the parameter indicate a greater likelihood of closure of the element, and lower values a lesser likelihood of closure of the element, or vice versa. Modifying the value of the parameter to indicate an increased likelihood of closure may therefore involve increasing or decreasing the value of the parameter, and vice versa when modifying the value of the parameter to indicate a decreased likelihood of closure. In preferred embodiments, however, the passability parameter is such that lower values of the parameter indicate a greater likelihood of closure of the element, and higher values a lesser likelihood of closure of the element. The step of modifying the value of the passability parameter so that the likelihood of the element being closed decreases when a device is detected on the element moving in the applicable direction of travel may comprise increasing the value of the parameter.

Other factors may be used to modify the passability parameter to indicate a greater or lesser likelihood of closure as appropriate. In some embodiments the value of the passability parameter associated with each of one or more segments is modified such that the likelihood of the navigable element represented by the segment being closed is increased, when a report is received from an external source indicative of the navigable element being closed. The method may comprise modifying, for each of one or more segments, the value of the passability parameter associated with a segment such that the likelihood of the navigable element represented by the segment being closed is increased, when a report is received from an external source indicative of the navigable element being closed. The step of modifying the value of the passability parameter so that the likelihood of the element being closed increases when at least one report is received from an external source indicative of the element being closed may comprise decreasing the value of the parameter.

In these embodiments in which the method comprises modifying the value of the passability parameter when a report is received from an external source indicative of the element represented by the segment associated with the parameter being closed, the external source is external to the system, e.g. providing a closure report that is independent to any such determination based on probe data. The value may be modified each time that a report is received. The method may comprise modifying the value of the passability parameter when each one of a plurality of reports are received indicative of the element being closed, the reports being obtained from different external sources. Reports may be obtained from any one of a number of external sources. By way of example the report may be any one of: a user report (such as may be received via a navigation device, website, etc.); an automatically generated report, such as may be generated when a navigation device deviates from a planned route, changes heading suddenly, accelerates/decelerates when not expected; a governmental feed; a journalistic feed; or a human moderated feed. The present invention allows reports to be taken into account in the same manner regardless of their origin, with the passability parameter providing a simple way to fuse reports received from various sources. By way of example the report may be any one of the types described earlier. The receipt of a report will provide a change in the passability parameter over and above the change which occurs with respect to time to indicate a greater likelihood of closure.

Regardless of how they are used in determining the potential closure of an element, reports may identify the geographic location of a road closure in any manner as desired. For example, a report may provide a point location, a line location or an area location. The point location may, for example, be the location of a navigation device when the user reported a navigable element, e.g. road, closure. Such a point location can be used to identify a single segment in the map that is reported as being closed, or it may be used to identify a plurality of segments, e.g. all the segments within an area centred on the point location, that are reported as being closed. The line location may be the actual identity of the segment, or plurality of segments, on a digital map reported by a user as being closed. The area location may, for example, be defined by a user providing a plurality of points on a digital map that together define an enclosed geographic region. Such an area location can be used to identity a plurality of segments within the defined area; all of which are reported as being closed. The method may, in any of these cases, comprise identifying the or each segment of the electronic map to which a received closure report relates, and modifying the passability parameter of the or each identified segment. This may be achieved using a suitable map matching technique.

In some preferred embodiments, each modification of the value of the passability parameter, e.g. in respect of the detection of a device on the element or the receipt of a closure report, provides a discrete step, i.e. a discrete jump or drop as appropriate, in the value of the passability parameter to provide a new starting point from which the value of the parameter then decays with respect to time. The magnitude of the step may be set as desired. In some embodiments the discrete step in respect of the detection of a device on the element according to the positional data is a fixed step, i.e. whenever a device is detected, the parameter undergoes the same fixed step in value. The discrete step in respect of a report being received from an external source indicative of the closure of the element may similarly be a fixed step. Where the steps are fixed, they may be set the same or differently for the modifications based upon detection of a device and receipt of a closure report. However, although use of fixed steps may be particularly simple, it is envisaged that variable size steps for modifications in respect of the detection of different devices on the segment, or the receipt of different reports may be used. As discussed below, in some embodiments, the magnitude of the step in the case of a received report may vary dependent upon the source of the report. Similarly, the modifications in respect of reports or detected devices need not provide discrete steps in the value of the parameter.

Preferably the method comprises modifying the value of the passability parameter so that the likelihood of the element being closed as indicated by the passability parameter decreases each time a device is detected on the element represented by the segment. The detection of each device may provide another discrete step in the value of the parameter. Preferably the method comprises modifying the value of the passability parameter so that the likelihood of the element being closed as indicated by the passability parameter increases each time a closure report is received indicating the closure of an element represented by the segment. The detection of each device or the receipt of each report may provide another discrete step in the value of the parameter.

Where factors in addition to positional data are used to determine the closure of an element, e.g. the receipt of external reports, the passability parameter readily enables the identification of a potentially closed navigable element to be based upon the different types of evidence. Taking into account multiple types of evidence may provide greater reliability in determining when an element is closed. The extent to which the passability parameter is influenced by the different factors may be tuned as desired to weight the various factors, and provide a desired reliability for a particular application. Further factors may be taken into account if desired by causing the passability parameter to be influenced by those factors. The passability parameter therefore provides a simple and effective way to identify closure candidate elements based upon various types of information, from multiple sources.

However, as mentioned above, the techniques of the present invention are particularly applicable to determining "false positive" closures which may arise when a closure determination is based upon positional data alone. While probe data, or in fact a lack thereof, may provide a useful indication as to closure, e.g. when a device has not been detected on the element in the applicable direction of travel according to the probe data for some time, such data may not always provide conclusive evidence of closure, and it is useful to be able to verify such closures. Thus, in some embodiments, the one or more navigable elements identified to be in a closed state are determined to be closed using only positional data relating to the movement of devices with respect to time along the elements, and not with the support of closure reports. Of course, the techniques of the present invention are equally applicable where other factors are additionally taken into account in reaching a closure determination, allowing any incorrect closures to be identified.

In the present invention, once a navigable element is identified as being in a closed state, positional data, e.g. current (or "live") data, is used to determine a second visit interval for the segment representing the navigable element, wherein the second visit interval is indicative of an average time interval between consecutive devices being detected on the element when in the closed state.

The step of determining an average visit interval for an element in the closed state, i.e. the second visit interval, using positional data is performed for at least some of the navigable elements determined to be closed. The techniques of the present invention are particularly applicable to determining "false positive" closures which may arise, for example, when a closure determination is based upon positional data alone. The elements may be a subset of the elements determined to be closed.

The second visit interval for an element is determined by analysing positional data relating to the movement of devices along the navigable element with respect to time when in a closed state. Only positional data relating to the movement of devices along the element when in a closed state is considered, i.e. positional data relating to the movement of devices when the element is open is not used. This may be achieved using data relating to times after a determination that an element is closed. The interval is a statistical expectation of the period of time between which consecutive probe devices are expected to be detected traversing the navigable element, and is based upon intervals between actually detected devices. The average visit interval may be derived in any suitable manner based upon a plurality of (detected) time intervals between consecutive pairs of devices passing along the element according to the positional data. The average may be any type of average, e.g. a mean. The average visit interval may be taken over any given time period. The time period should be selected as appropriate to provide a degree of confidence that the element is indeed open.

In accordance with the invention, it is determined that an element is in fact in an open state when a parameter based on the determined second visit interval for segment representing the navigable element passes a predetermined threshold value. The parameter may, in some embodiments, simply be the determined second visit interval, although it is envisaged that the parameter could be based on an inverse of the second visit interval, e.g. in a similar manner to the passability parameter discussed above. In embodiments in which the parameter is the second visit interval, an element is determined to be open when the second visit interval falls below the predetermined threshold value.

The predetermined threshold is preferably set at a value, based on one or more properties of the segment, wherein the flow of vehicles along the navigable element represented by the segment is too high for the segment to be considered closed. This flow may, for example, be less than is expected by the first visit interval, e.g. since some of the traffic that typically travels along the element may have been diverted to another element for some reason, but it is still sufficiently high to indicate that the road is not closed.

The predetermined threshold value is preferably based on one or more parameters indicative of the significance (or importance) of the element, i.e. the expected flow along the segment. This is because, for example, the visit interval for a main road would typically need to be substantially lower than the visit interval for a minor road, before it can be considered open. The parameters may include, or be based on, one or more of: a functional road class of the segment representing the element; a speed limit associated with the segment representing the element; an expected speed of travel for the element, etc.

The predetermined threshold value may be time dependent, such that the appropriate threshold is selected for the current time (or time period) in which a determination is being made about whether a segment has been mistakenly been closed. Thus, in preferred embodiments, the predetermined threshold value may be selected based on the current time and one or more parameters indicative of the importance of the relevant segment, e.g. functional road class, speed limit, expected speed (based on historic data), etc The present invention considers positional data relating to the movement of a plurality of devices with respect to time along navigable elements to determine whether elements of the network are closed, and subsequently to determine whether the elements should be opened. The step of using the positional data to identify that a navigable element is closed may be performed in relation to one or more, and preferably a set of a plurality of elements, or each element represented by a segment of the electronic map. The elements may be any element in respect of which appropriate positional data is available to enable the method to be performed.

It will be appreciated that the network of navigable elements, and any navigable element, as referred to herein, are navigable elements of a real world or physical navigable network. The network is represented electronically by electronic map data. The electronic map data may be stored by or otherwise accessible by the server, in embodiments in which the method is implemented using a server. In the electronic map data, the navigable network is represented by a plurality of segments connected by nodes. Each segment of the electronic map represents at least a portion of navigable element of the navigable network. A segment may represent a portion of a navigable element of the navigable network, e.g. the carriageway in a particular direction of travel or a portion of the length thereof.

As will be appreciated, a navigable segment as referred to herein may be uni-directional or bi-directional. Thus, any closure or reopening of a segment may relate to the closure or reopening thereof in the or a given direction of travel on the segment. Where used, a passability parameter relates to the likelihood of closure of the segment in the or a given direction of travel permitted on the segment. A navigable element of the navigable network may be represented by more than one segment of the electronic map. For example, lanes for travel in one direction may be represented by a different segment to those for travel in an opposite direction. Such an element may be represented by two uni-directional segments of the electronic map. The passability parameter associated with a segment in preferred embodiments of the invention is indicative of the likelihood of closure of the element represented by the segment in a given direction of travel. In such embodiments the value of the passability parameter associated with the navigable segment representing an element is preferably modified so that the likelihood of the element being closed in the at least one direction indicated by the passability parameter decreases when the positional data indicates that a device has been detected on the element moving in the applicable direction of travel. Thus, the positional data that is used is that relating to the applicable direction of travel. Similarly, the modification of the value of the passability parameter associated with a segment representing an element may occur when a report is received from an external source indicative of the element being closed in the given direction of travel. A determination as to potential closure of a navigable element, or its reopening, relates to the particular direction of travel considered.

The present invention may be implemented in relation to navigable elements of any type. Preferably the navigable elements are road elements (of a road network). In some embodiments the navigable element(s) are elements of a highway, but it will be appreciated that the techniques are applicable to any type of road element, or indeed other type of navigable element, where appropriate positional data exists or can be determined. While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network. The present invention is therefore applicable to detecting a reopening of any navigable element.

The positional data used in accordance with the invention (whether to determine the closure or reopening of an element) is positional data relating to the movement of a plurality of devices along the or each navigable element with respect to time. The method may comprise obtaining positional data relating to the movement of a plurality of devices with respect to time in the network of navigable elements, and filtering the positional data to obtain positional data relating to the movement of a plurality of devices along a given navigable element with respect to time in the applicable direction. The step of obtaining the positional data relating to the movement of devices along a navigable element may be carried out by reference to the electronic map data indicative of the navigable segment representing the navigable element of the network. The method may involve the step of matching positional data relating to the movement of devices in a geographic region including the network of navigable elements to at least the or each navigable segment of the electronic map that is being considered in accordance with the invention.

In some arrangements the step of obtaining the positional data may comprise accessing the data, i.e. the data being previously received and stored. For "live" positional data, it will be appreciated that the data may be stored shortly before being used, so that it may still be considered to be live data. In other arrangements the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from a plurality of devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. The positional data obtained from the plurality of devices is commonly known as "probe data". Data obtained from devices associated with vehicles may be referred to as vehicle probe data. References to "probe data" herein should therefore be understood as being interchangeable with the term "positional data", and the positional data may be referred to as probe data for brevity herein. Of course, the positional data may be obtained from a combination of different devices, or a single type of device. However, the present invention is not limited to the use of positional data obtained from a particular type of device, or devices associated with a particular form of transport, e.g. vehicles, and probe data from devices associated with multiple forms of transport may equally be taken into account. Typically, any probe data indicative of the movement of a device with respect to time along a navigable element may be used to determine the potential closure of the element. The present invention may provide "live", i.e. short term, detection of closures and reopening of elements based on current or near current data. For live positional data, it will be appreciated that the data may be stored shortly before being used, so that it may still be considered to be live data.

The method of the present invention preferably involves obtaining and using "live" positional data relating to the movement of a plurality of devices with respect to time along the or each navigable element (in the applicable direction of travel). Live data may be thought of as data which is relatively current and provides an indication of relatively current conditions on each alternative navigable element. The live data may typically relate to the conditions on the elements within the last 30 minutes, 15 minutes, 10 minutes or 5 minutes. By using live positional data in determining the closure information, it may be assumed that the information determined is currently applicable, and may be applicable in the future, at least in the shorter term. The use of live positional data allows accurate and up to date closure information to be determined, that can be relied upon by road users and/or navigation devices or ADAS. Preferably the positional data that is used in accordance with the invention, whether to determine the closure of an element or its subsequent opening, is or comprises live positional data.

The methods of the present invention are computer implemented, and may provide the ability to automatically detect closed segments and the opening thereof, and thus the navigable elements thereby. When a segment is identified as in a closed state and/or open state, the method may comprise the step of automatically generating a message indicative of the determined state of the segment as appropriate. The message may, in respect of a closure, trigger the determination of an average visit interval in the closed state for the segment in order to verify that the segment is indeed closed. It is envisaged that the methods of the invention may be implemented continually by a server or servers, as live positional data relating to the movement of devices in the navigable network is received.

In accordance with the invention in any of its embodiments involving the determination of a closure of a navigable element, once a determination has been made that a closure exists affecting navigable element, the information may be used in various manners. In some embodiments the method comprises associating data indicative of the existence of the closure with data indicative of the segment of the electronic map representing the navigable element. The method therefore may comprise storing data indicative of the existence of the closure, preferably in association with data indicative of the navigable segment. The method may comprise using the determined data indicative of a closure in calculating a route and/or in providing traffic information, e.g. to devices associated with vehicles. The method may comprise providing information indicative of the determined closure to a third party, e.g. a traffic information provider or a traffic management centre, or directly to one or more remote devices, e.g. navigation devices.

When it is determined that the average visit interval for an element in the closed state, or a parameter based thereon, has passed the predetermined threshold value, the method comprises identifying that the element is open. Once a determination has been made that a previously closed navigable element has reopened, the method may comprise modifying data indicative of the existence of the closure associated with data indicative of the segment of the electronic map representing the navigable element to indicate that the element is once again open. For example, a flag indicating that the segment is closed may be removed. The method therefore may comprise storing data indicative of the existence of the open state of the segment, preferably in association with data indicative of the navigable segment. The data may indicate that the segment has been determined as reopened after an initial closure finding. The method may comprise using the determined open state of the element in calculating a route and/or in providing traffic information, e.g. to devices associated with vehicles. The method may comprise providing information indicative of the determined open state of an element to a third party, e.g. a traffic information provider or a traffic management centre, or directly to one or more remote devices, e.g. navigation devices. Where an element is determined to be in an open state once more following a preliminary finding of a closure, e.g. without validation, a closure message may not yet have been sent out. The reopening data may be used to update internal data indicative of the closure of the element.

In some embodiments the method may comprise, when an element is identified as being open, associating data indicative of the open state with data indicative of the segment of the electronic map representing the element. It is useful to be able to determine the closure and reopening history of a segment. The method may comprise storing data indicative of a passability value history associated with a given segment or segments.

The method may comprise at least one of: displaying the reopening data on a display device; transmitting the reopening data to a remote device for use thereby; and using the reopening data when generating a route through the navigable network represented by the electronic map.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

The present invention is, in preferred embodiments at least, directed to methods and systems for determining when a road element of a network of road elements has wrongly been identified as closed. Accurate determination of the existence of road closures is important in a navigation system, or simply as additional travel information to drivers. A road closure will have an impact on possible routes between an origin and a destination, necessitating alternative routes around the closed element to be used. In practice, the existence of a road closure has an effect on the road network comparable to a traffic jam of infinite severity. Whether or not a route is pre-calculated, it is important to users of a navigation system to be informed of road closures so that they can take a different route if needed. Conversely, it is important to be able to determine when an element that was previously closed should be considered to be open, avoiding the need to e.g. route around the element. The present invention provides a method for automatically detecting closures and, where necessary, identifying false positive closures, in a quicker and more reliable manner than possible with conventional approaches.

Figure 1:
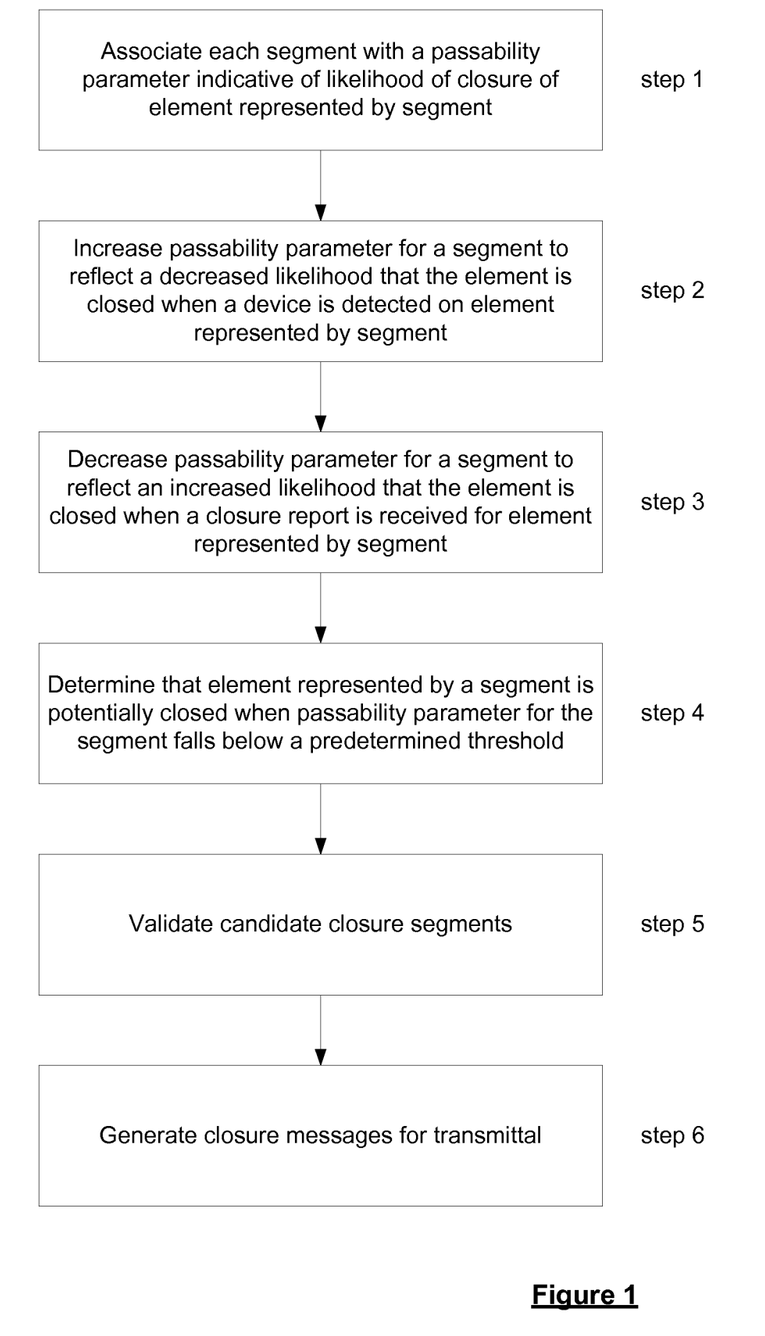
FIG. 1 is a flow chart illustrating the steps of a method for detecting the closure and reopening of a road element in accordance with an embodiment of the invention.

A preferred embodiment of the method of detecting a road closure in accordance with the invention will be described by reference to the flow chart of FIG. 1. The method exemplified by FIG. 1 is realised in a live system using live positional data, e.g. GPS probe data available for analysis within a short period of time, e.g. 3 minutes. The probe data is vehicle probe data received from devices associated with the vehicles, e.g. GPS devices, whose position corresponds to that of the vehicle. The probe data may alternatively be referred to as "positional data". The probe or positional data is associated with temporal data, e.g. such that the probe data is a sequence of geographic positions, e.g. defined as latitude and longitude coordinates; each geographic position having an associated time stamp indicating a time at which the vehicle was at the respective position. The probe data can be used to derive probe traces relating to travel of probe vehicles along specific road elements in a road network. The positional data may be matched to road segments of a digital map representing the network of road elements.

Each element of the road network is represented by a segment of an electronic map. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. According to step 1 of the method, each segment is associated with a passability parameter, which is indicative of the likelihood that the road element represented by the segment is closed. The passability parameter is determined using a bounded function, which may vary between 1 and 0, with lower values indicating increased likelihood of closure. The passability parameter decays according to an exponential function with respect to time. More detailed discussion and examples of the passability parameter will be provided below. The value of the passability parameter at any particular time indicates the likelihood of closure of the road element under current conditions, i.e. at the current time.

In accordance with step 2 of the method, whenever a device is detected on the element represented by a segment according to the probe data, the passability parameter for the segment is increased to reflect a decreased likelihood that the element is closed. This is achieved by map matching probe data to the segments of the electronic map, and determining when a device is detected on a particular segment. The detection of each device on the element triggers a step increase in the value of the passability parameter to a higher value. After each step, the passability parameter starts to decay again, from this new starting point, in accordance with the exponential function.

In accordance with the invention, the system further receives closure reports relating to road elements of the network from a number of external sources. These may include reports from any of the following types of source: (i)

reports from map users, e.g. provided via navigation devices (or other location aware devices) or websites, e.g. as part of a community map update function, (ii) automatically generated reports, e.g. based upon the actions of users of navigation devices when a device deviates from a planned route, changes heading suddenly, accelerates/decelerates when not expected; (iii) governmental feed, e.g. from the owners or controllers of the road network; (iv) journalistic feed; and (v) human moderated feed. The reports may identify a closure in relation to a single point, navigable element or map segment, or a navigable stretch comprising at least a portion of one or more navigable elements. Where the report identifies a closure by reference to a navigable element or elements of the real world network, the method may involve map matching the data to the segments of the electronic map to identify the segment or segments affected.

In accordance with step 3 of the method, which is optional, whenever a report is received indicating that a road element represented by a segment of the electronic map is closed, the passability parameter associated with that segment is decreased to reflect an increased likelihood that the element is closed. As with the modification of the passability parameter in response to detection of a device on the element, each report triggers a step decrease in the value of the passability parameter to a lower value. After each step, the parameter starts to decay again. In some embodiments, the size of the stepped decrease in the passability parameter is dependent upon the source of the report, such that more reliable reports, e.g. from a governmental feed, will prompt a larger decrease, potentially to bring the parameter to a value below the threshold prompting a closure finding. Optionally the passability parameter of an adjacent segment or segments of the map may also be decreased and/or or that of a segment representing an element that is known, based on historical data, to be likely to also be closed. The decrease in the passability parameter for these adjacent, or related segments, may be equal to or less than that for the segment to which the report relates.

The passability parameter for each segment of the electronic map is continually monitored. In accordance with step 4 of the method, when the passability parameter associated with a segment falls below a first predetermined threshold, it is determined that the element represented by the segment is potentially closed, i.e. that it is a closure candidate. This closure threshold may be set to any desired value, and is discussed in more detail below.

In step 5, candidate closed segments identified are optionally subjected to a validation process. This involves using external closure reports once more. Where it is found that an closure report has been received in relation to a navigable stretch comprising at least a portion of one or more navigable segments of the network, (if appropriate after map matching), and which stretch overlaps the closure candidate segment, then the segment may be verified as closed, as there is a high degree of confidence that it is indeed closed. In this step, identified candidate closed navigable elements may be used to identify further closed elements. For example, two elements considered to be potentially closed, and which are not connected to one another, may be taken as indicative that there is a closed stretch additionally incorporating a road element or elements connecting the two elements.

The result of the validation process may be a set of road elements, and hence segments that can be assumed to be closed with an appropriate degree of confidence. Data indicative of the road elements whose closure has been validated may be used as desired. For example, the data may be transmitted to another server, or directly to navigation devices or ADAS systems associated with vehicles, for use, for example, in route planning and/or display thereon. The data may be provided as part as a traffic update transmission. Thus, the server may store the data, generate a message indicative thereof, and/or disseminate the data for use by navigation devices or ADAS systems associated with vehicles, or to another server, etc—see step 6 of FIG. 1.

Figure 2:
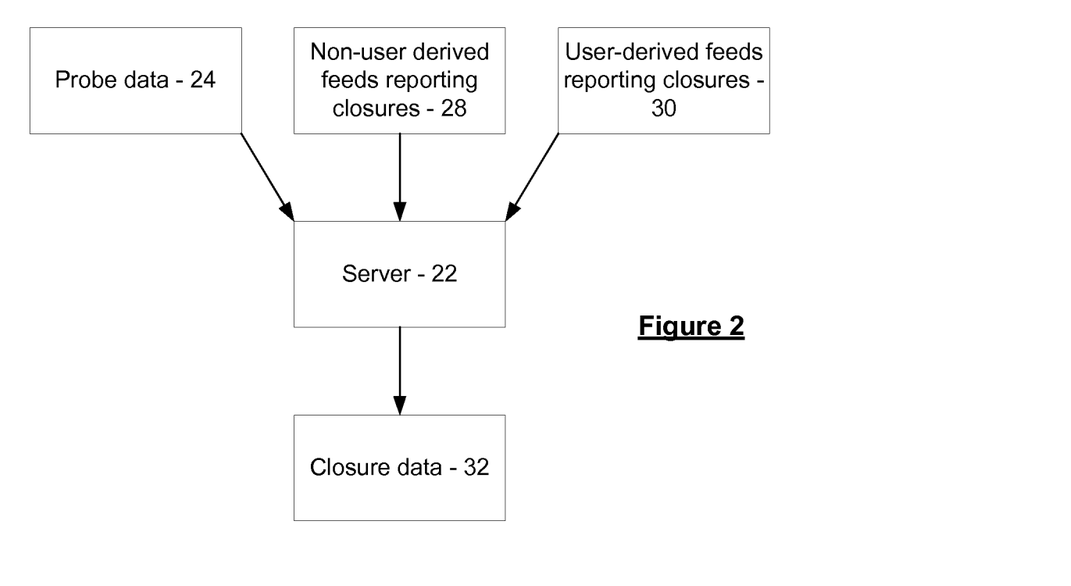
FIG. 2 shows a system which may be used to implement the methods of the invention.

FIG. 2 illustrates an exemplary system which may be used to implement the method of the invention. The system includes a server 22 which performs the method of the present invention. The server receives various inputs. The server 22 receives GPS probe data 24, non-user derived external feeds reporting closures 28, such as government feeds, journalistic feeds, etc, and user derived closure reports 30, e.g. user initiated reports or reports determined automatically from user behaviour, e.g. of devices associated with the user. The server 22 uses these various inputs in providing the output closure and reopening data 32.

Some more details will now be given regarding an exemplary implementation of the passability parameter.

The passability parameter for a segment is indicative of the likelihood of closure of the segment, and is based upon the relative flow along the segment over time. The relative flow along the segment is quantified by an expected visit interval for the segment. The expected visit interval for the segment is the expected time interval between two consecutive probes being detected on the segment. One way in which the expected visit interval may be determined will be described below.

The passability parameter for the segment decreases exponentially over time t by a rate that is based on the expected visit interval. For example, the passablity parameter can be defined as:

$$\text{passability}(t) = \text{passability}(t=0) e^{-\beta t}$$

The decay rate $\beta$ is inversely proportional to the expected visit interval, and wherein the constant of proportionality may be a parameter used to correct for various effects or artefacts associated with the measurements of probe traces. For example, the parameter may define the flow expected in a closure, as, for various reasons, it has been found that traces may still be observed over the segment even in the event of a closure. It will be seen that the rate of decay of the passability will be greater where the visit interval is smaller, and smaller where the visit interval is greater. This is because devices are expected to be detected less frequently on segments with a greater visit interval. By using a slower rate of decay for such segments, the likelihood of premature attaining of the closure threshold is reduced, so that it should only be obtained when there is a real likelihood of closure of the segment. Conversely, where there is a lower visit interval for a segment, the closure threshold should still be reached where appropriate.

Each time a device is detected on the road element represented by the segment, the passability is increased by a discrete jump (of a fixed amount). Each time a closure report is received indicating that the road element represented by the segment is closed, the passability is reduced by a discrete jump. The jump may be of the same or different amount to that used when increasing the parameter, and the size of the jump may vary depending upon the nature of the report, or may be of fixed sized. Each time the value of the parameter jumps up or down, it will begin to decay in accordance with the exponential function from the new starting value.

When the passability parameter value drops below a certain threshold value, it is determined that the element represented by the segment is potentially closed.

It will be appreciated that the level of the threshold for closure determination, and the size of the jumps on detection of devices/receipt of closure reports may be set as desired for a given system.

The expected visit interval may be based on an average visit interval for the segment. It will be appreciated that this visit interval relates to the visit interval when the segment is in an open state, in contrast to the average visit interval in the closed state that is used to identify false positive closures as described above. The average visit interval can be determined using historic probe data and updated periodically. For example, the expected visit interval may be based on an average visit interval for the segment over a month, and updated monthly. This average may be a simple arithmetic average and/or an exponential moving average.

However, by its nature, the expected visit interval is likely to be highly dynamic depending on the daily traffic pattern over the segment. The expected visit interval preferably reflects this time dependence. In preferred embodiments, rather than determining many different average visit intervals for the segment applicable to different times or time periods (although this is possible), an appropriately time dependent expected visit interval may be determined by appropriately scaling a given average visit interval for the segment, e.g. determined over a monthly period (or other time period as desired).

That is:

expected visit interval=average visit interval×scaling factor

The scaling factor is time dependent, and will generally contain information about either the current flow in the vicinity of the segment or the expected flow at that time of the day. For instance, the scaling factor may be determined dynamically based on the current number of connected devices, i.e. probes in the system. Particularly:

$$\text{scaling factor} = \frac{\text{average number of concurrent probes}}{\text{current number of concurrent probes}}$$

The average number of concurrently connected devices (or probes) may be based upon data collected over a suitable time period, e.g. 1 month. Storing, and dynamically scaling, a single average visit interval for each segment is generally more numerically efficient than storing the multiple such average visit intervals as a function of time.

In this way, the expected visit interval for a given time, and hence the decay rate of the passability, is adjusted depending on the current conditions. Where there are a large number of currently connected devices, e.g. during rush hour, the expected visit interval will be shorter and the passability will decay more rapidly. The expected visit interval may be recalculated for each point in time, or such an interval may be determined using current data that is then considered to be applicable for a given time period, e.g. 15 minutes.

It will be appreciated that the above description of the passability parameter is only exemplary, and other forms of the parameter may be used. Furthermore, scaling of the parameter to reflect current conditions may be achieved in other manners, not necessarily through the decay function, e.g. by adjusting the height of the "jumps", or multiplying the exponential function by a time dependent scaling factor.

Figure 3:
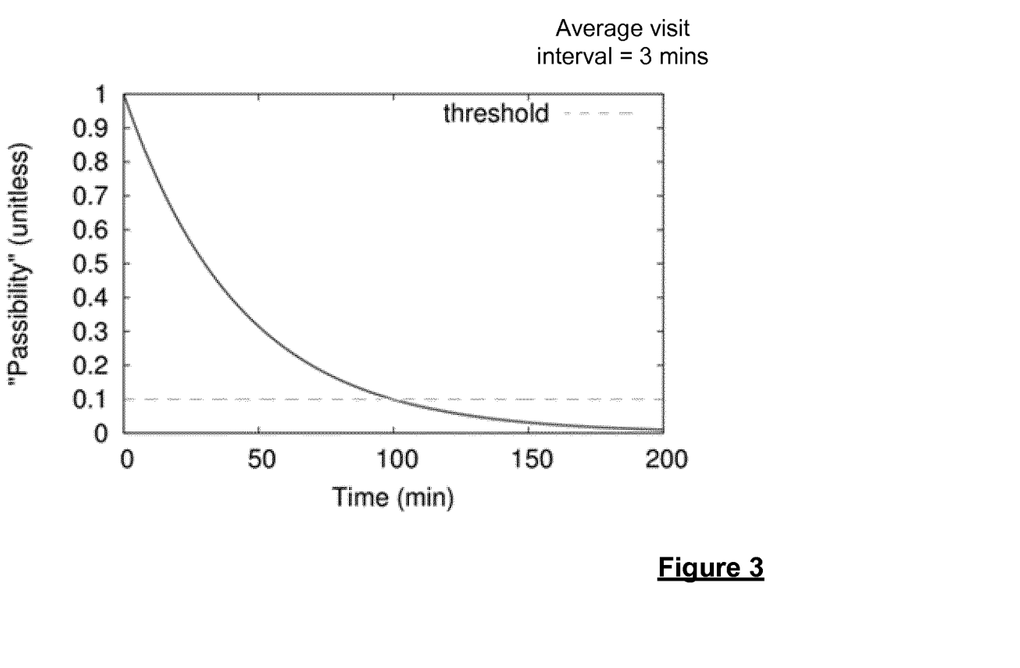
FIG. 3 illustrates the decay of the passability parameter for a road segment with respect to time.

FIG. 3 illustrates in a simplified arrangement how the passability parameter for a segment may decay exponentially with time if it is not increased or decreased through detection of probes on the element represented by the segment, or by closure reports relating to the element represented by the segment. In this example, the closure threshold is shown at 0.1. However, this is merely exemplary. The expected visit interval (here, for simplicity, being a constant visit interval which does not change over the timeframe shown) is 3 minutes.

Figure 4:
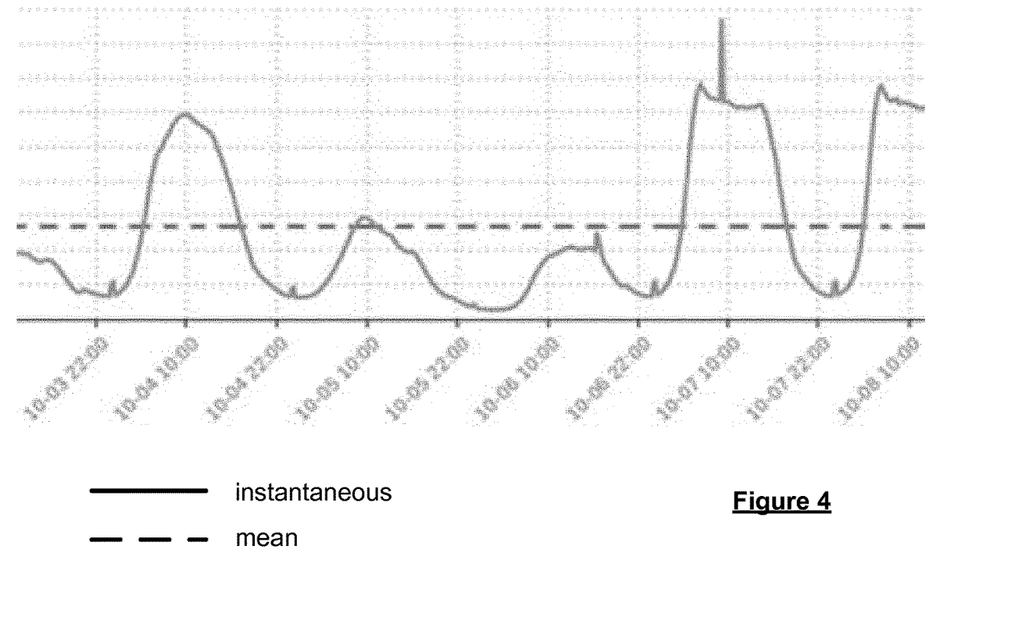
FIG. 4 illustrates the variation in concurrent probe numbers in the system at different times.

FIG. 4 illustrates the variation in the number of concurrent probes detected in the system with respect to time. More specifically, the solid line shows the variation in the instantaneous count of concurrent probes in the system over a series of days, i.e. 3 October at 22h00 to 4 October at 10h00 through to 8 October at 10h00, and the dotted line shows the average (or mean) count of concurrent probes in the system. This therefore illustrates indirectly how the expected visit interval for a segment might be expected to change over time depending upon traffic patterns.

Figure 5:
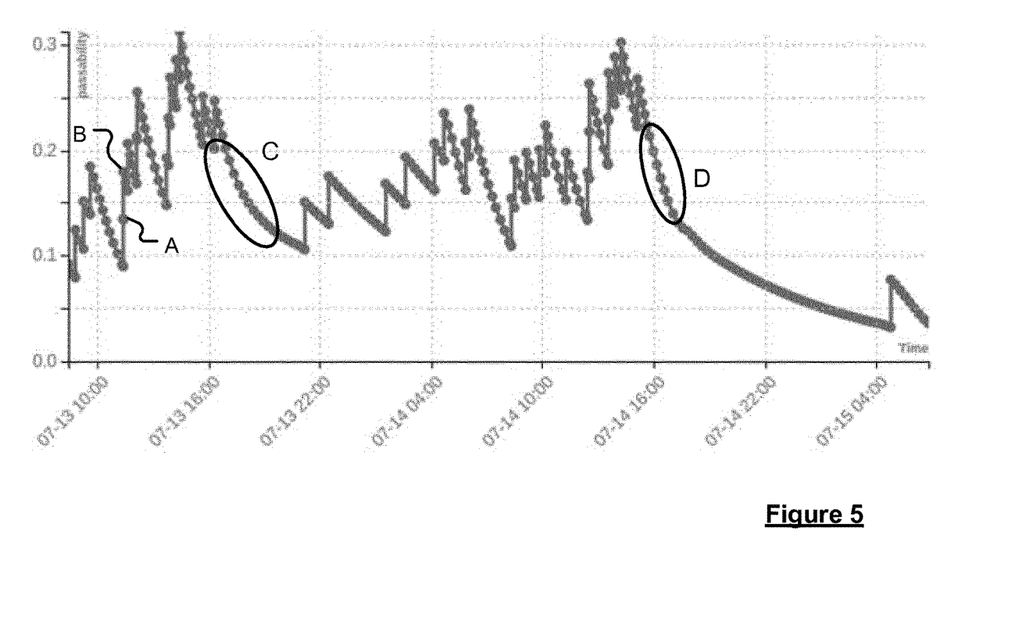
FIG. 5 illustrates the variation in passability parameter with respect to time in one exemplary embodiment.

FIG. 5 illustrates the variation in passability parameter for a segment in accordance with an embodiment of the invention. Each detection of a device on the element represented by the segment prompts an increase in the parameter, to reduce the likelihood of closure indicated thereby, e.g. as illustrated by points A and B. Conversely each closure report received prompts a jump decreasing the parameter (not shown) increasing likelihood of closure. As soon as the value of the parameter has jumped in either direction, it starts to decay once more, until the next jump occurs. This figure also shows how the rate of decay varies at different times, based upon the change in expected visit interval. For example, the rate of decay in region C is less steep than in region D, corresponding to a time when the expected visit interval was greater.

Figure 6:
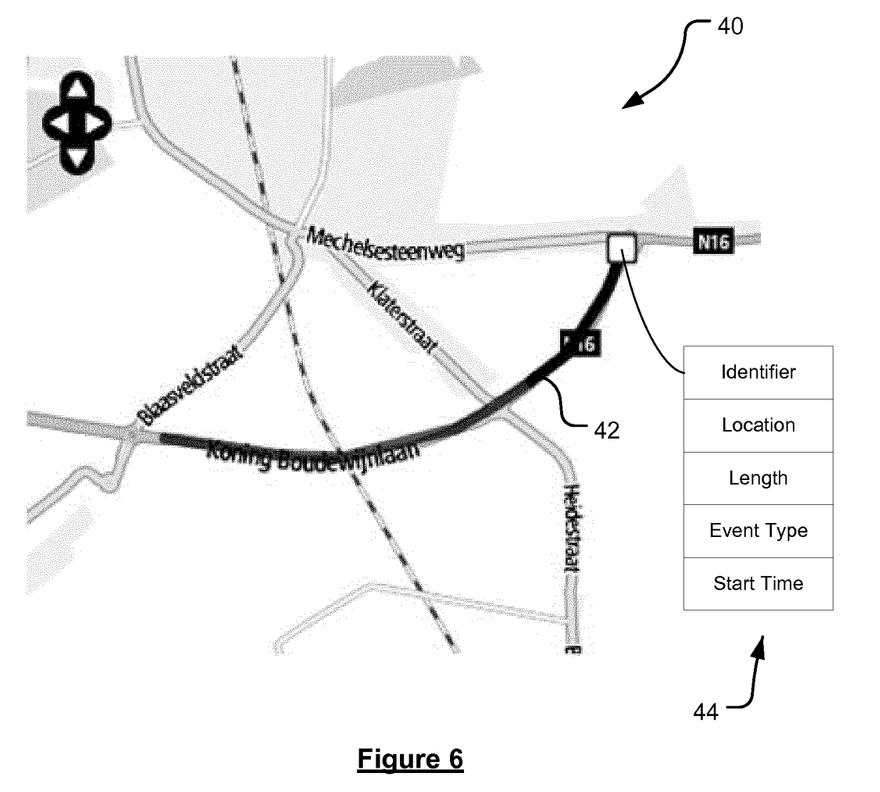
FIG. 6 shows a visual representation of a digital map with an indication of a determined road closure.

FIG. 6 shows a visualisation 40 of the road network geographic area created using data from a digital map representative of the road network. Following the completion of the method depicted in FIG. 1, a road stretch 42 has been identified as being closed. A message 44 associated with the determined road closure is generated, e.g. for transmittal to route planning or navigation device, or to a traffic management centre, contains information such as: an identifier; a location (e.g. with respect to the digital map); a length of the road stretch determined to be closed; an event type identifier (in this case identifying that the stretch of road is closed); and a start time (indicating when the stretch was first determined to be closed). As will be discussed in more detail below, a similar message can be generated once the road stretch 42 has been identified as again being open, such that the road stretch can again be considered for route planning and/or navigation purposes.

It has been recognised that there are times when probe data in particular may suggest that an element is closed, when in fact it is in an open state. This may occur, for example, when a new road element has opened in the vicinity of the element that provides an alternative route, resulting in a reduction in traffic flow along the element. Until the expected flow along the element has been updated, this may lead to an erroneous conclusion that the element is closed.

In accordance with the invention, at least some of the segments deemed to be closed may be subjected to a further process to ensure that any such "false positive" closures are identified. It will be appreciated that this method may be performed in relation to all, or a subset of the closed segments. It is desirable that the method is performed at least in relation to those segments which have been deemed to be closed based upon probe data alone, i.e. without reference to any external reports. The method may be performed in addition to, or instead of, any preceding validation step as described in relation to step 5. A preferred method of detecting such "false positive" closures is shown in FIG. 7.

Figure 7:
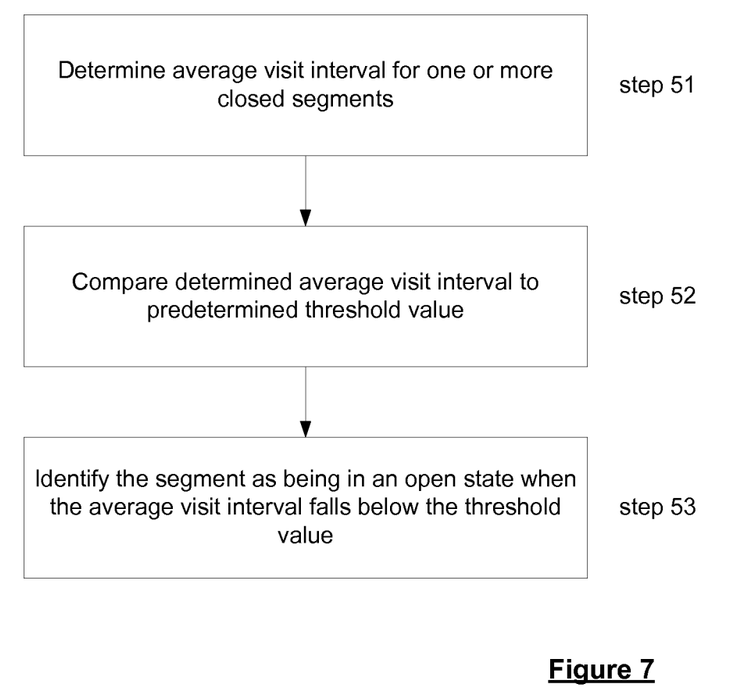
FIG. 7 is a flow chart illustrating the steps of a method for detecting that a road element was mistakenly determined to be closed, such that the road element can be reopened again in the system, in accordance with an embodiment of the invention.

In step 51 of FIG. 7, for each closed segment that is to be subjected to this further process, probe data relating to the movement of devices along the road element represented by the closed segment when the element is in the closed state is analysed to determine an average visit interval for the segment. The average visit interval is the average time interval between consecutive devices being detected along the segment.

In step 52, the average visit interval for the segment is compared to a predetermined threshold value. The threshold value is based upon a measure of the significance of the segment, e.g. one or more of functional road class (FRC), speed limit, expected speed associated with the segment, etc, and may be time dependent. The more significant the segment, the higher the level of flow, and hence the lower the average visit interval that is required before it can be determined that the segment is in fact in the open state. Clearly where the average visit interval falls below an appropriate threshold it may be assumed that the element represented by the segment is open, as such levels of traffic flow would not be consistent with the element being closed.

In step 53, when the average visit interval for a segment falls below the threshold value, the segment is determined to be open once again, and a message indicative of the open state of the segment is generated, e.g. similar to that shown in FIG. 6. Alternatively or additionally, data indicative of the open state may be generated, stored and/or disseminated e.g. to ADAS or navigation devices, in the same manner as closure data.

Finally, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of detecting when a navigable element previously determined to be closed is in an open state, the navigable element forming part of a network of navigable elements within a geographic area, each navigable element being represented by one or more respective segments of an electronic map, the method comprising:
    obtaining positional data relating to the movement of a plurality of devices along the navigable elements of the navigable network with respect to time;
    identifying a navigable element as being in a closed state based at least on the positional data and a first visit interval associated with the navigable element, wherein said first visit interval is indicative of an expected time interval between consecutive devices being detected on the navigable element when in an open state, wherein the segment representing the navigable element is associated with a passability parameter that indicates a likelihood of the navigable element being in the closed state, wherein the passability parameter has a value between a first limit representative of flow along the navigable element at an expected or greater than average level and a second limit representative of zero flow on the navigable element based on traversals of devices of the navigable element, wherein the value of the passability parameter automatically tends to the second limit over time in accordance with a function, which is based on the first visit interval, so that the likelihood of the navigable element being in the closed state increases with respect to time, and wherein the navigable element is identified as being in the closed state based at least in part on the value of the passability parameter;
    using the positional data to determine a second visit interval for the navigable element, wherein said second visit interval is indicative of an average time interval between consecutive devices being detected on the navigable element when in the closed state; and
    changing the navigable element to be in an open state when a parameter based on the determined second visit interval for the navigable element passes a predetermined threshold value.

2. The method of claim 1, wherein the predetermined threshold value is based on one or more parameters indicative of the significance of the navigable element.

3. The method of claim 2, wherein the one or more parameters include, or are based on, at least one of: a functional road class of the navigable element; a speed limit associated with the navigable element; and an expected speed of travel for the navigable element.

4. The method of claim 1, wherein the first visit interval is based on an average visit interval determined using historic positional data relating to the movement of devices along the navigable element with respect to time.

5. The method of claim 4, wherein the first visit interval is determined by scaling the average visit interval in dependence on the number of devices concurrently present in the network of navigable elements at a given time.

6. The method of claim 1, wherein the first visit interval is time dependent.

7. The method of claim 1, wherein the identification of the navigable element as being in the closed state comprises:
    modifying the value of the passability parameter associated with the segment representing the navigable element, such that the likelihood of the navigable element being closed is decreased, when the positional data indicates that a device has been detected traversing the navigable element; and
    identifying the navigable element as being in the closed state when the value of the passability parameter associated with the navigable element passes a predetermined threshold value.

8. The method of claim 1, comprising:
    generating data indicative of the identified closed state of the navigable element, and associating the data with the navigable element; and
    generating data indicative of the change of the navigable element to an open, and associating data indicative of the open state with the navigable element.

9. The method of claim 1, further comprising, once a determination has been made that a previously closed navigable element is in an open state, modifying data indicative of the existence of the closure associated with data indicative of the navigable element to indicate that the navigable element is once again open and/or associating data indicative of the open state with data indicative of the navigable element.

10. The method of claim 9, further comprising at least one of: displaying the data indicative of an open state on a display device; transmitting the data indicative of an open state to a remote device for use thereby; and using the data indicative of an open state when generating a route through the navigable network represented by the electronic map.

11. A system for detecting when a navigable element previously determined to be closed is in an open state, the navigable element forming part of a network of navigable elements within a geographic area, each navigable element being represented by one or more respective segments of an electronic map, the system comprising a memory and a processing resource configured to:
obtain positional data relating to the movement of a plurality of devices along the navigable elements of the navigable network with respect to time;
identify a navigable element as being in a closed state based at least on the positional data and a first visit interval associated with the navigable element, wherein said first visit interval is indicative of an expected time interval between consecutive devices being detected on the navigable element when in an open state, wherein the segment representing the navigable element is associated with a passability parameter that indicates a likelihood of the navigable element being in the closed state, wherein the passability parameter has a value between a first limit representative of flow along the navigable element at an expected or greater than average level and a second limit representative of zero flow on the navigable element based on traversals of devices of the navigable element, wherein the value of the passability parameter automatically tends to the second limit in accordance with a function, which is based on the first visit interval, so that the likelihood of the navigable element being in the closed state increases with respect to time, and wherein the navigable element is identified as being in the closed state based at least in part on the value of the passability parameter;
use the positional data to determine a second visit interval for the navigable element, wherein said second visit interval is indicative of an average time interval between consecutive devices being detected on the navigable element when in the closed state; and
change the navigable element to be in an open state when a parameter based on the determined second visit interval for the navigable element passes a predetermined threshold value.

12. A non-transitory computer readable medium provided with a computer program product comprising computer readable instructions executable to perform a method of detecting when a navigable element previously determined to be closed is in an open state, the navigable element forming part of a network of navigable elements within a geographic area, each navigable element being represented by one or more respective segments of an electronic map, the method comprising:
obtaining positional data relating to the movement of a plurality of devices along the navigable elements of the navigable network with respect to time;
identifying a navigable element as being in a closed state based at least on the positional data and a first visit interval associated with the navigable element, wherein said first visit interval is indicative of an expected time interval between consecutive devices being detected on the navigable element when in an open state, wherein the segment representing the navigable element is associated with a passability parameter that indicates a likelihood of the navigable element being in the closed state, wherein the passability parameter has a value between a first limit representative of flow along the navigable element at an expected or greater than average level and a second limit representative of zero flow on the navigable element based on traversals of devices of the navigable element, wherein the value of the passability parameter automatically tends to the second limit over time in accordance with a function, which is based on the first visit interval, so that the likelihood of the navigable element being in the closed state increases with respect to time, and wherein the navigable element is identified as being in the closed state based at least in part on the value of the passability parameter;
using the positional data to determine a second visit interval for the navigable element, wherein said second visit interval is indicative of an average time interval between consecutive devices being detected on the navigable element when in the closed state; and
changing the navigable element to be in an open state when a parameter based on the determined second visit interval for the segment representing the navigable element passes a predetermined threshold value.

13. The system of claim 11, wherein the predetermined threshold value is based on one or more parameters indicative of the significance of the navigable element.

14. The system of claim 11, wherein the first visit interval is based on an average visit interval determined using historic positional data relating to the movement of devices along the navigable element with respect to time.

15. The system of claim 14, wherein the first visit interval is determined by scaling the average visit interval in dependence on the number of devices concurrently present in the network of navigable elements at a given time.

16. The system of claim 11, wherein the identification of the navigable element as being in the closed state comprises:
when the positional data indicates that a device has been detected traversing the navigable element, modifying the value of the passability parameter associated with the segment representing the navigable element such that the likelihood of the navigable element being closed is decreased; and
identifying the navigable element as being in the closed state when the value of the passability parameter associated with the navigable element passes a predetermined threshold value.

17. The non-transitory computer readable medium of claim 12, wherein the predetermined threshold value is based on one or more parameters indicative of the significance of the navigable element.

18. The non-transitory computer readable medium of claim 12, wherein the first visit interval is based on an average visit interval determined using historic positional data relating to the movement of devices along the navigable element with respect to time.

19. The non-transitory computer readable medium of claim 12, wherein the identification of the navigable element as being in the closed state comprises:
when the positional data indicates that a device has been detected traversing the navigable element, modifying the value of the passability parameter associated with the segment representing the navigable element such that the likelihood of the navigable element being closed is decreased; and
identifying the navigable element as being in the closed state when the value of the passability parameter associated with the navigable element passes a predetermined threshold value.

* * * * *